May 15, 1962 W. A. MALTHANER ETAL 3,035,252

DATA HANDLING EQUIPMENT

Filed Dec. 28, 1956 6 Sheets-Sheet 1

INVENTORS: W. A. MALTHANER
J. F. MÜLLER
BY John C. Morris
ATTORNEY

May 15, 1962 W. A. MALTHANER ET AL 3,035,252

DATA HANDLING EQUIPMENT

Filed Dec. 28, 1956 6 Sheets-Sheet 2

INVENTORS
W. A. MALTHANER
J. F. MÜLLER
BY John C. Moris
ATTORNEY

May 15, 1962 W. A. MALTHANER ET AL 3,035,252

DATA HANDLING EQUIPMENT

Filed Dec. 28, 1956 6 Sheets-Sheet 3

INVENTORS: W. A. MALTHANER
J. F. MULLER
BY John C. Morris
ATTORNEY

INVENTORS
W. A. MALTHANER
J. F. MULLER
BY John C. Morris
ATTORNEY

INVENTORS W. A. MALTHANER
J. F. MÜLLER
BY John C. Morris
ATTORNEY

INVENTORS: W. A. MALTHANER
J. F. MULLER
BY John C. Moris
ATTORNEY

United States Patent Office 3,035,252
Patented May 15, 1962

3,035,252
DATA HANDLING EQUIPMENT
William A. Malthaner, New Providence, and John F. Müller, Montclair, N.J., assignors to Bell Telephone Laboratories, Incorporated, New York, N.Y., a corporation of New York
Filed Dec. 28, 1956, Ser. No. 631,366
12 Claims. (Cl. 340—172.5)

This invention relates to data handling systems and more particularly to magnetic tape information storage apparatus for use in connection with digital data transmission systems.

One common characteristic of electronic information handling systems is that the rate of information processing is almost universally much greater than the maximum rate of manual introduction of information into the system and of the reproduction at the output of the system. Therefore, some form of information speed conversion or storage is necessary in conjunction with both the input and output stages if the system is to operate at anywhere near its efficient rate. Common forms of information storage means include punched cards, perforated tape, magnetic drums and magnetic tape. Employing such storage media it is customary to prepare in advance of introduction into the system upon separate apparatus operating in the nature of a typewriter, a record of the information to be handled and then to transfer the record to the input stage of the system for introduction at a higher rate of speed. At the output stage the information is again converted to a preservable form at a lower rate of speed.

One type of data handling system having this characteristic need for speed transformation imposes in addition several other severe requirements upon the storage apparatus. This type of system is represented by the data transmission system disclosed in the copending application of G. P. Darwin et al. Serial No. 560,966, now U.S. Pat. No. 2,828,362, filed January 24, 1956. This system affords the virtually error free transmission of binary coded information from one telephone subscriber to another over the same telephone circuits used for voice communication between the parties. In fact the system allows the alternate use of the telephone handset and the high speed data transmitting subset at will under the control of the subscribers. The patent application Serial No. 601,-302, now U.S. Patent No. 2,937,367, filed July 31, 1956, by G. G. Bailey et al. discloses and claims apparatus for reproducing the information at the receiving station.

In addition to the speed conversion function of the storage apparatus, it is essential that the information in the form of several, for example seven, information bits constituting a single character appearing simultaneously over as many input leads must be converted to serial order for transmission in tandem over a single telephone channel. Likewise, after conversion from parallel to serial order the individual groups of bits constituting a character must be set apart from the preceding and following bits in order that the information content will be recoverable at the receiving station. The information bits of each character must be introduced into the transmission system at a uniform rate in order for synchronized operation of the transmitting and receiving station data subsets.

The rate of input of characters from the manually operated typewriter is intermittent due to pauses of the operator and the necessity of performing such operations as carriage return, backspace and tabulate. Such intermittencies must be eliminated from the recorded information if the system is to operate at an efficient rate. On the other hand, since the typewriter operations mentioned above do require a finite time, the magnetic recording device advantageously includes means for detecting such operation, recording a code indicative of the operation followed by a space on the recorded medium sufficiently long to allow the reproducing device at the receiving station to duplicate the operation. Likewise, when operations at the original recording station are not essential for later reproduction, it is desirable that such actions be recognized and be eliminated from the recorded magnetic medium.

All the above requirements are met by apparatus in accordance with this invention one embodiment of which comprises a tape transport mechanism carrying the magnetic tape or recording medium for the information, a shift register connected to receive the information bits constituting a single character simultaneously from an encoding device or typewriter and to discharge the bits serially to a recording head positioned adjacent the magnetic tape. The tape transport mechanism includes a latch responsive to the completion of storage of a character in the shift register to release the driving mechanism and allow the magnetic tape to advance rapidly. Photoelectric means is operative responsive to movement of the transport mechanism to discharge the information from the shift register and to record a character identifying mark for each character group. A control circuit is connected so as to recognize both the operation and sequence of operation of manual controls, such as, carriage return and backspace of the encoding device and thereupon to introduce a combination of information bits into the shift register indicative of the control which was operated. The control circuit likewise is connected to the transport mechanism so as to effect the advance of the recording medium for a distance commensurate with the time required for the input device, e.g., typewriter and its counterpart at the receiving station to duplicate the carriage return, backspace or other operations.

One feature of this invention involves the connection of a temporary storage means for conversion of information bits from parallel to serial array and for discharge thereof to a magnetic recording head in response to operation of the magnetic tape transport mechanism.

Another feature of this invention relates to the presence of means which is responsive to operation of the tape transport mechanism for recording a group distinguishing mark between each group of information bits.

Still another feature of this invention encompasses the inclusion of means for detecting the operation of controls on the encoding device and thereupon introducing a code symbol into the storage means and effecting the advance of the magnetic tape for a distance commensurate with the time required for the duplicating of the operation by the receiving station decoding device.

Still another feature of this invention relates to the presence of logic circuitry for determining the sequence of operations of controls of the encoding device and thereupon recording a code symbol and space on the magnetic tape equal to the net time required to duplicate the multiple operations.

These and other features of this invention may be more clearly understood from the following detailed description and by reference to the drawing in which.

Figures 5A, 5B:
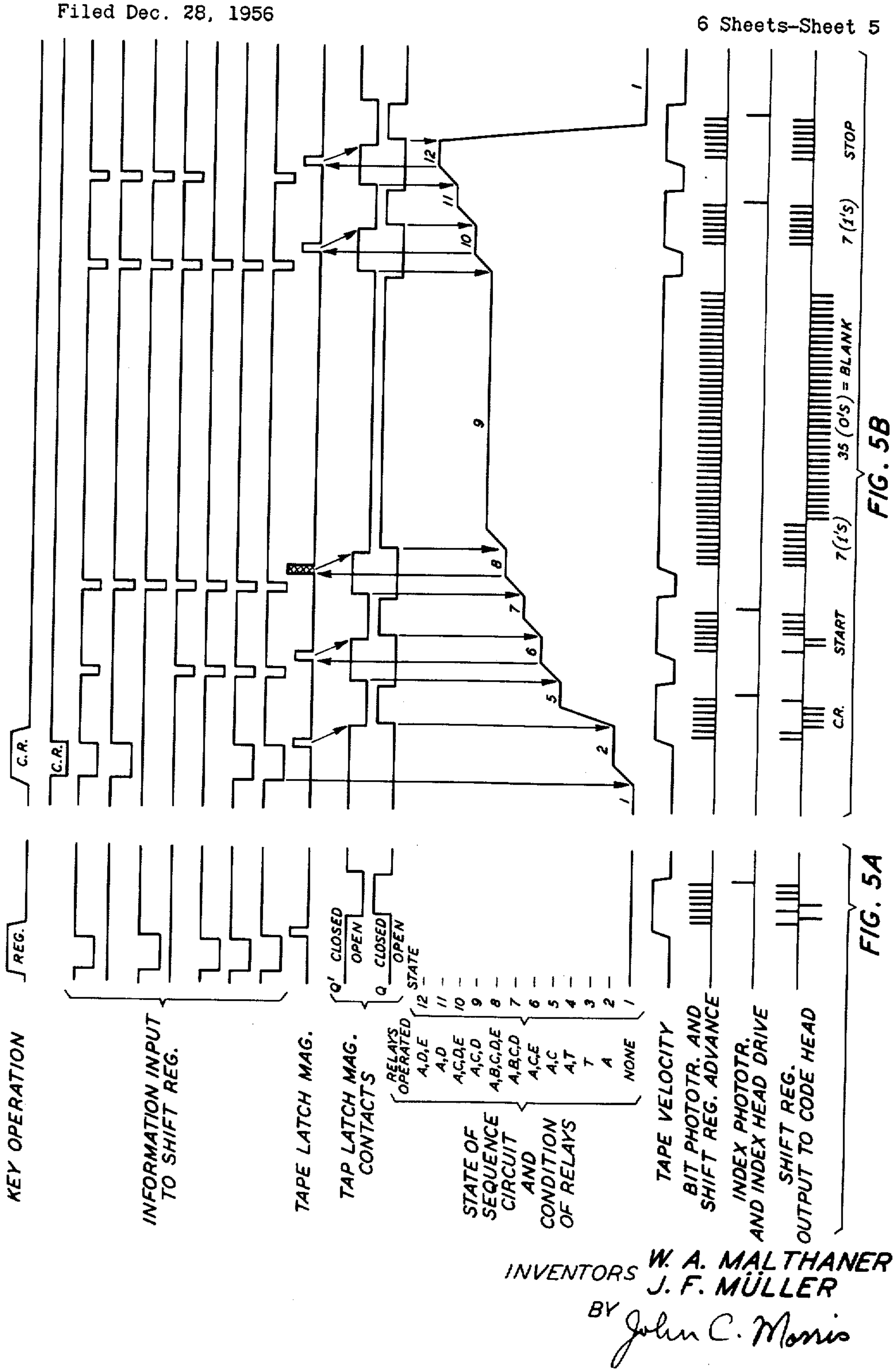

FIGS. 5A, B, and C constitute a time sequence diagram of the operation of apparatus in accordance with this invention.

Figure 1:
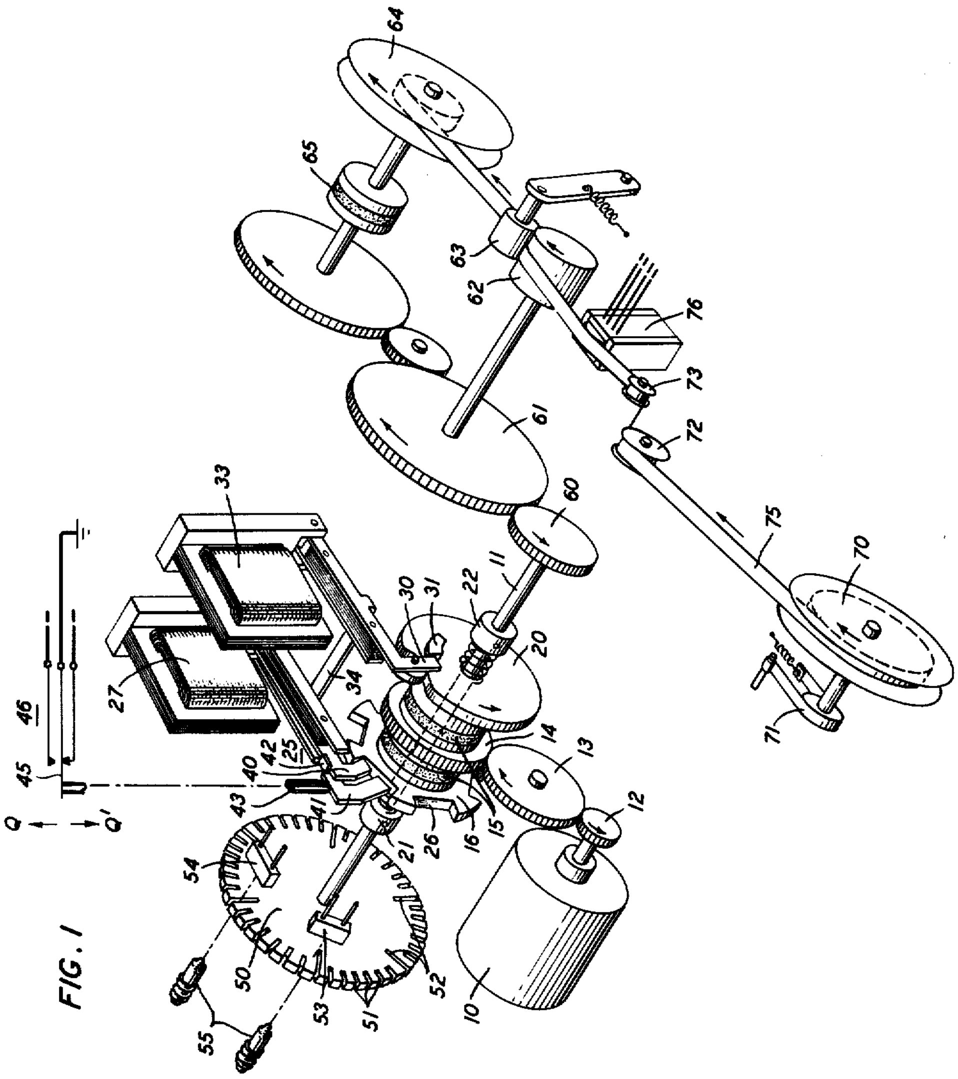
FIG. 1 is a mechanical schematic representation of the tape transport mechanism and associated apparatus of this invention.

Referring now to FIG. 1, the drive system of the apparatus may be seen as including a synchronous motor 10 coupled to a main drive shaft 11 through a gear train including gears 12, 13, and 14, the last of which includes a clutch surface 15 on each side engaging on one side a clutch surface on an escapement wheel 16 which is secured to the main drive shaft 11, and a similar clutch surface on a cam 20 rotatably mounted on the main drive shaft 11. Both the escape wheel 16 and cam 20 are mechanically biased against the gear 14 by springs bearing against collars 21 and 22, respectively. The escapement wheel 16, which is secured to the main drive shaft 11, is restrained from movement by a magnetically actuated double pawl assembly 25 which rides in one of six notches 26 in the periphery of the escapement wheel 16. The double pawl assembly 25 forms a part of the armature of a relay 27 hereinafter designated as the character latch since it is actuated once for each character recorded by the apparatus.

The cam 20, similar to escapement wheel 16, is restrained from motion but by a single pawl 30 which in its non-actuated position rides against a projection 31 on the side of the cam 20. The single pawl 30 forms a part of the armature of a relay 33 which when energized allows the drive shaft 11 to make one complete revolution and allows the magnetic tape to travel a distance equal in length to six characters. It is desirable to divide the information into blocks for control purposes during transmission. Relay 33 is operated to produce the division into blocks. It, therefore, is termed the block latch. The armature of the block latch 33 includes a tab 34 which extends under the double pawl assembly 25 of the character latch 27 so as to lift that assembly 25 every time that the block latch 33 is energized.

The double pawl assembly 25 of the character latch 27 includes a leading pawl 40, which is an elongation of the latch armature, and a following pawl 41 which is pivotally secured to the armature. The following pawl 41 includes a tab 42 which overlies the leading pawl 40 so that the leading pawl 40 will raise the following pawl 41 each time that the character latch 27 is energized. The combined length of the pawls 40 and 41 is slightly less than the lenght of each notch 26 in the escapement wheel 16. With this arrangement of pawls 40, 41 and the tab 42, upon the energization of the latch 27 winding both pawls 40 and 41 are lifted and the escapement wheel 16 is allowed to rotate while the pawls 40 and 41 ride on the periphery of the escapement wheel 16. The energizing current of the latch 27 lasts only for a few milliseconds and by the time that the escapement wheel 16 has rotated sufficiently that the leading pawl 40 no longer rides on the wheel periphery, the latch 27 has been deenergized and the leading pawl 40 falls into the next notch 26. The following pawl 41 remains in its actuated position until it also is opposite the next notch 26 at which time it falls into that notch. The leading pawl 40 prevents any overrun of the magnetic tape which might be encountered where only a single pawl was used and the pawl failed to drop into the succeeding notch after de-energizing the latch winding. The following pawl 41 is arranged to fall into a notch 26 just prior to the instant that the leading pawl 40 strikes the end of the notch 26 thereby minimizing the possibility of bounce back of the drive shaft 11 as it is stopped. Resting on the following pawl 41 is a plunger 43 which operates the moving contact 45 of a switch 46 shown schematically in the drawing. When the pawl 41 is in its non-actuated position the plunger is depressed and contact Q' is closed and contact Q is open. As the pawl 41 is raised, either by operation of the character latch 27 or the space latch 33, the plunger 43 is lifted and contact Q' is opened followed by the closing of contact Q.

Secured to one end of the main drive shaft 11 is a light interrupter wheel 50 with its periphery segmented by forty-two evenly spaced slots 51. Every seventh slot 52 is of greater depth than the remaining slots 51. On one side of the light interrupter wheel 50 is photosensitive element 53, for example, a phototransistor positioned so as to be energized by light passing through each of the slots. A similar photosensitive element 54 is positioned equal to the spacing of seven and one-half slots from the first or bit photosensitive element 53 and at such a level that it is energized only by light passing through the deeper slots 52. On the opposite side of the light interrupter wheel 50 are light sources 55 for each photosensitive element. With this arrangement of slots 51 and phototransistors 53 and 54, the bit phototransistor 53 is energized at intervals corresponding to equally spaced increments of rotation of the main drive shaft 11. The second or index photosensitive element 54 is energized and thereby produces an output pulse once for each seven of the shallow slots 51 and the output pulse occurs between output pulses of the bit photosensitive element 53.

Coupled to the opposite end of the main drive shaft 11 from the light interrupter wheel 50 through gears 60 and 61 is a magnetic tape drive drum 62 having a spring loaded idler 63 mechanically biased against its surface. Also geared to the main drive shaft 11 is a take-up reel 64 including a friction clutch 65. A magnetic tape supply reel 70 having a brake 71 and idler wheels 72 and 73 completes the magnetic tape transport assembly. Shown in its normal position is a magnetic tape 75 which extends from the supply reel 70 over idler 72 under idler 73 past a double or two-track magnetic recording head 76 over the drive drum 62 and beneath its idler 63 and to the take-up reel 64.

As shown in FIG. 1, the tape transport mechanism is in its normal condition, that is, with the synchronous motor 10 in operation turning gears 13 and 14 but with the remainder of the drive assembly locked by the pawls 30, 40 and 41 while the clutch surfaces 15 of gear 14 slip with respect to the clutch surfaces of the escapement wheel 16 and cam 20. The release of the pawls 30, 40 and 41 is under the control of the associated circuitry shown in FIG. 2 having in one set of electrical input circuits the contacts Q and Q' of switch 46 which indicate the status of the magnetic tape 75, to wit, either stopped or moving. The photoresponsive elements 53 and 54 which are similarly responsive to movement of the tape transport mechanism provide at uniform increments of magnetic tape 75 advance pulses of output used in the associated circuitry to control the recording of information bits on the magnetic tape or recording medium.

Figure 2:
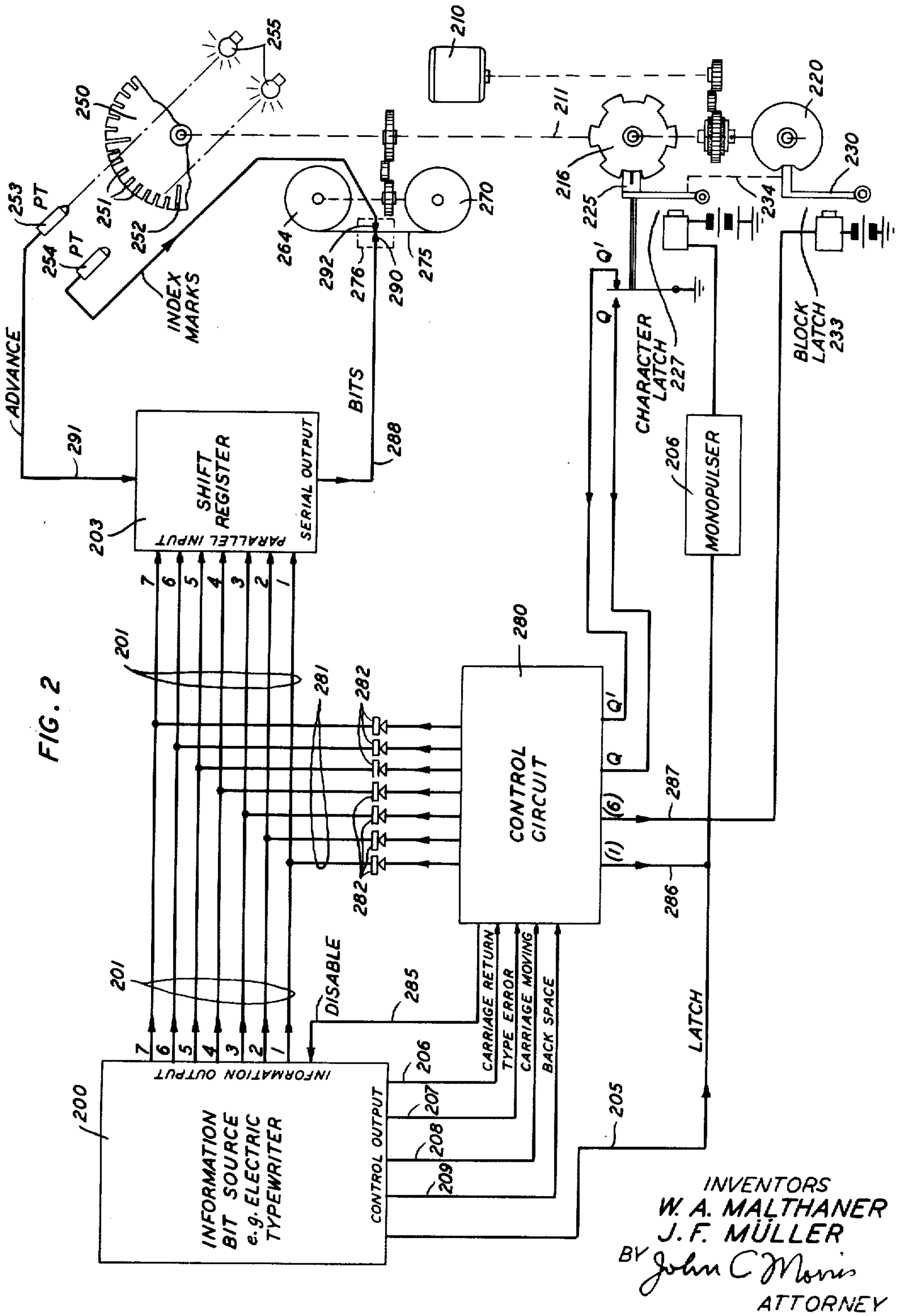
FIG. 2 is an electrical schematic representation of the circuitry of this invention.

Referring now to FIG. 2, this invention includes an information bit source 200 whether the source be a computer or a manually controlled input device, such as an electric typewriter. For purposes of description, the information bit source is described as an electric typewriter, e.g., a model FPC 8A Flexowriter manufactured by the Commercial Controls Corporation, having information output leads, seven in number, and five control outputs. The information outputs are leads 201 connected to appropriate relay contacts within the typewriter certain of which are closed as the result of the information bit conversion by depressing any one of the letter or numeral keys of the typewriter. For example, the letter A is coded in binary form as 1100111 and the numeral 5 is represented by 1010101. The "1's" indicate closed relay contacts or the presence of a pulse on the output lead while a zero indicates that the relay contacts connected to that lead are open or the absence of an output pulse. The seven output leads are connected to individual stages of a shift register 203 preferably of the magnetic core type disclosed in the copending application of G. G. Bailey et al. cited above. The control outputs of the information bit source are leads 206, 207, 208 and 209 responsive, for example, to the controls available to the operator of an electric typewriter, respectively, carriage return, a control used to indicate a recognized typing error on the part of the operator, tabulate control, back space, and a latch output which is automatically energized after a key is depressed and when the seven information output leads have been in their information carrying condition. The latch output lead 205 is connected through a monostable multivibrator or monopulser 206 to the winding of the character latch 227 which in turn is connected through a battery to ground. The monopulser 206 is provided to actuate the character latch 227. The remaining control outputs all are connected to a control circuit 280 which is shown in more detail in FIGS. 3 and 4. The control circuit is connected to introduce code combinations into the shift register 203 via parallel leads 281. The control circuit 280 includes a disable output 285 connected to the information bit source 200 so as to prevent any output from that apparatus during the time that a code combination of bits for control purposes is being introduced into the shift register 203 from the control circuit 280. The disable lead 285, for example, may open the information output leads 201 of the information bit source 200.

The control circuit 280 includes two other output leads, a first lead 286 labeled "1" connected as a parallel input to the character latch 227 with the latch lead 205 from the information bit source 200. Therefore the control circuit 280 may also release the character latch 227 to allow the advance of the drive system for one character. The control circuit 280 includes a "6" output lead 287 connected to the winding of the block latch 233 which in turn is connected through a battery to ground. The "6" output allows the advance of the drive system for a space equal to six characters by the lifting of pawl 230 directly and by the lifting of the pawl assembly 225 via tab 234 shown schematically in FIG. 2.

The control circuit 280 includes inputs Q and Q′ from the similarly identified contacts associated with the character latch 227. The input leads Q and Q′ indicate the condition of the magnetic tape, either at rest when the circuit through contact Q′ is closed, or moving during the time that contact Q is closed.

The shift register 203 includes the seven parallel information input connections 201 which receive information selectively from the information bit source 200 or the control circuit 280 depending upon whether a normal character key or a control button is depressed by the operator. The input to the shift register is termed parallel owing to the nearly simultaneous input of the seven information bits one over each lead. The shift register has but a single or serial output lead 288 connected between its stage corresponding to the No. 1 parallel input lead 201 and the information bit recording head 290 of the assembly 276 which is positioned adjacent the magnetic tape 275.

The shift register 203 includes an advance input load 291 connected directly from the bit photoresponsive element 253 adjacent the shallow slots 251 in the light interrupter wheel 250. The bit photoresponsive element 253 is arranged to be energized seven times during the rotation of 60 degrees of the drive shaft 211 upon operation of the character latch 227. The output from the bit photoresponsive element 253 is a train of seven successive pulses spaced equally with respect to incremental movements of the magnetic tape 276. At the same position along the length of the magnetic tape as the recording head 290 is a second or index mark magnetic recording head 292 which is connected to the photoresponsive element 254 arranged to be energized by light passing through the deep slots 252 in the light interrupter wheel 250, i.e., once for each character following the seventh bit by a space equal to one-half bit. The drive mechanism for the magnetic tape 276 is shown in schematic form in FIG. 2 including motor 210 necessary gearing the escapement wheel 216, the cam 220, the drive shaft 211, the light interrupter wheel 250, and the magnetic tape supply reel 270 and take-up reel 264. Light sources 255 and photoresponsive elements 253 and 254 are shown on opposite sides of the wheel 250.

Figure 3:
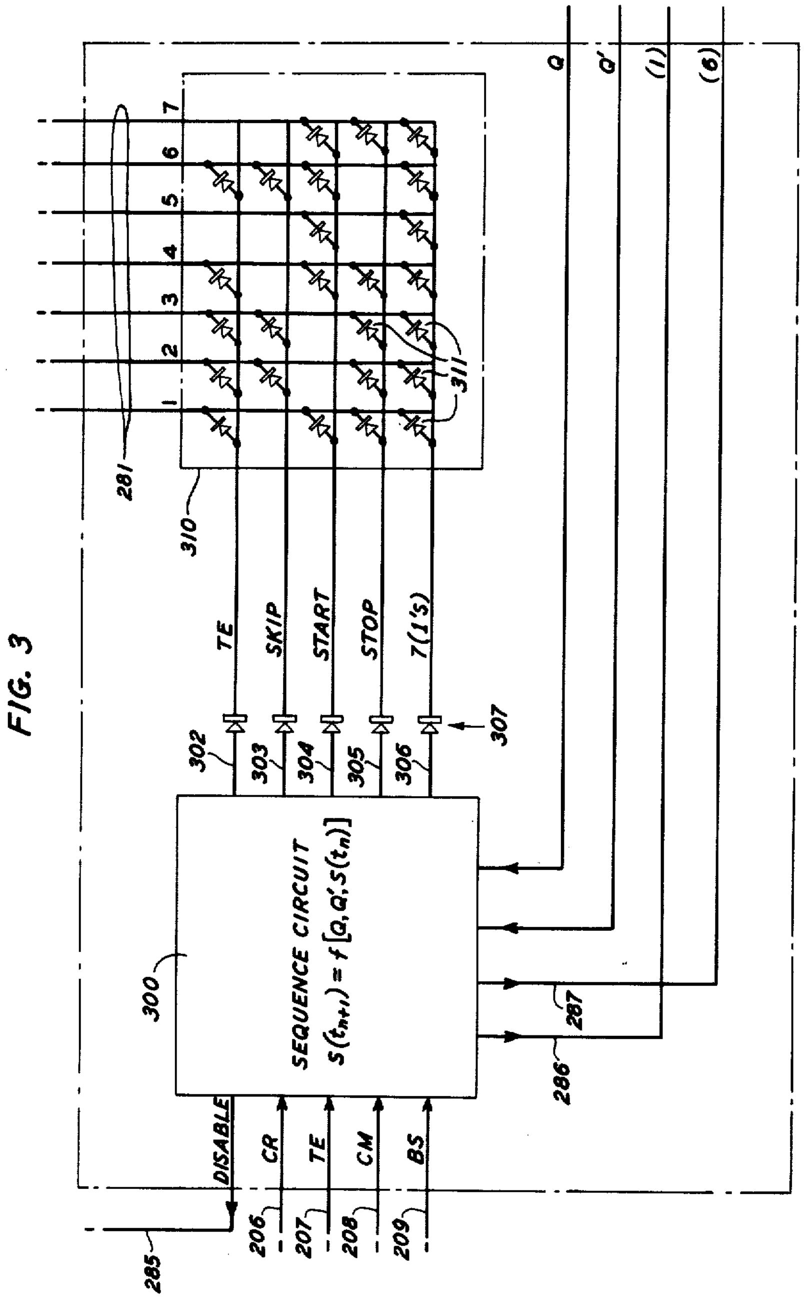
FIG. 3 is an enlarged more detailed representation of the control circuit of FIG. 2.
Figure 4:
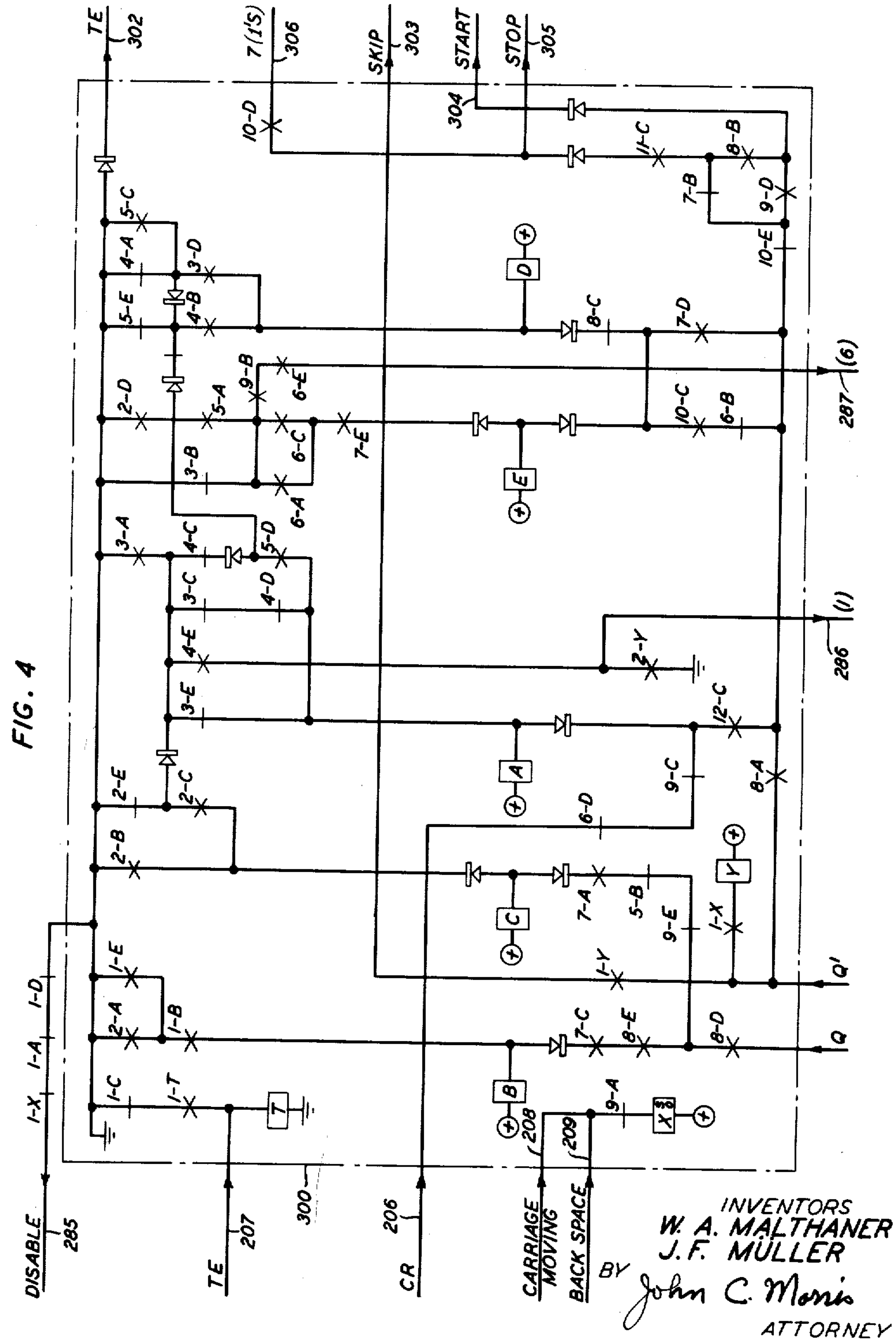
FIG. 4 is an example of a typical sequence circuit of FIG. 3.

The relationship of the control circuit to the transformation and recording process of the apparatus of this invention may be more clearly had by reference to FIG. 3 which is a more detailed enlargement of the control circuit of FIG. 2 and FIG. 4 which shows a representative relay sequence circuit 300 which may be employed. The control input leads from the information bit source are all connected to a conventional sequence circuit which may, for example, include relays connected as shown in FIG. 4 or in such a manner that there are a plurality of conditions or states including a neutral or state 1 from which it is advanced by the operation of one or more of the control keys and to subsequent states under control of the contacts Q and Q′ on the character latch 227. The sequence circuit may be described as operating in accordance with the relationship $$S(t_{n+1})=f[Q,Q,S(t_n)]$$

where

S=the state of the sequence circuit;
$t_n$=an instant of time $n$ intervals after a reference time, e.g., $t_0$;
Q=the condition of contacts Q; and
Q′=the condition of contacts Q′.

Referring again to FIG. 3, the sequence circuit includes the control input leads 206, 207, 208 and 209 described in connection with FIG. 2 as well as code output leads 302 through 306 connected through individual diodes 307 to a coding matrix 310 which produces a code input through leads 281 to the shift register 203 of FIG. 2. The coding matrix 310 is connected in a conventional manner with diodes 311 at certain of the crosspoints so that a pulse on one of the code leads 302 through 306 from the sequence circuit 300 is transmitted to the appropriate output leads 281. For example, the Typing Error code lead 302 is connected through diodes 307 and 311 to the one, two, three, four, and six output leads of the coding matrix 310. The Skip code lead 303 is connected through diodes 307 and 311 to the two, three and six coding matrix output leads, et cetera.

The single character release lead 286 and the six character or block lead 287 as well as the Q and Q′ character latch 227 leads are connected to the sequence circuit 300.

The sequence circuit advantageously performs the functions described hereinafter in connection with FIG. 5 and may comprise a network of relays, magnetic core, electron discharge, or semiconductive devices. For purposes of illustration, and without being limited thereto, a typical relay circuit arranged to perform the necessary functions is shown in FIG. 4. The sequence circuit 300 of FIG. 4 includes relays A, B, C, D and E which are operative in response to actuation of the carriage return and typing error key, relay T exclusively under the control of the typing error key and relays X and Y controlled by the back space and tabulate keys. The relays A through E and T produce a sequence of operations requiring a fixed length of magnetic tape advance. The relays X and Y on the other hand operate to record a series of skip code combinations, e.g., 0110010, for the entire length of time that the carriage is moving in response to operation of any of the control keys. The relay X is of a slow operating type so that the sequence producing a skip code is initiated except when a normal relay such as A operates indicating that the carriage is moving for carriage return. In such a case, the operation of relay A locks out relay X and the normal carriage return sequence follows. Circuit variations employing relays or any combination of the above elements to perform the same functions are within the purview of one skilled in the art and such variations do not constitute departures from this invention.

An understanding of the operation of the apparatus in accordance with this invention may be had by reference to FIG. 2 in conjunction with the time sequence diagram of FIGS. 5A, B and C.

In initiating the operation, the motor 210 is energized through an appropriate power switch and power source, and the information bit source 200 if, for example, an electric typewriter is conditioned for use, the operator may proceed to strike any of the character or numeral keys. As such a key is depressed, certain ones of a series of internal relays are operated in a code combination indicative of the particular character. The code is apparent as the open circuit or grounding of the seven output leads 201 connected to the individual stages of the shift register 203. In FIG. 5A the time of operation of a regular key is indicated in the top line followed by the condition of each of the information output leads 201 and the control or latch output 205. As illustrated, the key for the digit five was depressed and several milliseconds later the output leads all respond to their respective relays with the code 1010111. After the time during which all of the leads 201 are in their coded condition and the shift register 203 stages are all set, the latch output 205 of the electric typewriter 200 energizes the character latch magnet 227 through monopulser 206 releasing the escapement wheel 216 and thereby initiating the rapid advance of the magnetic tape 275. Travel of the magnetic tape 275 is over a distance of in the order of 7/150 inch which is sufficient to record seven serial information bits. As the magnetic tape 275 begins its motion, the light interrupter wheel 250 similarly moves and allows intermittent light to fall upon the phototransistor 253 which produces a series of seven positive pulses in the advance lead 291 to the shift register 203 arriving at intervals directly related to increments of advance of the magnetic tape 275. These advance pulses shift the information which was received in parallel in the shift register 203 from stage to stage and out through the serial output lead 288 to be recorded in proper order on the magnetic tape 275. During this process, the deep slot 252 in the light interrupter wheel 250 passes between a light source 255 and the photoresponsive element 254 a single similar pulse is produced which energizes the index or group mark recording head 292 thereby producing an index mark at the end of the seven serial bits. At this time the escapement wheel 216 has advanced one-sixth of a revolution and the pawl 225 drops into its at-rest position positively stopping the movement of the magnetic tape 275. The magnetic tape 275 remains stopped until a repetition of the same sequence of operations is initiated by the depressing of another key. During this time the sequence circuit, as may be seen in FIG. 5A, remains in the inactive state 1.

The operator finds it necessary on several occasions to manipulate the controls of the typewriter, for example, carriage return at the end of each line, or backspace, or tabulate, or the symbol known as typing error which is used to indicate that the typist has struck an improper character and recognizes it as such and will retype the entire line to eliminate the error. Upon reaching the end of a line on the input device or typewriter 200, the operator depresses the carriage return key which advances the paper in the machine, returns the carriage in preparation for the succeeding line and produces on the output leads 201 a code combination similar to a regular key. In addition to these functions which are carried on within the typewriter, the carriage return lead 206 from the typewriter 200 to the control circuit 280 is grounded advancing the sequence circuit 300 from state 1 to state 2. As the character latch contacts Q close, the relay circuit 300 is thereby advanced to state 5 during which time the carriage return code is recorded on the magnetic tape along wth an index mark. As the character latch pawls 225 re-engage and contacts Q′ again close, the sequence circuit 300 is advanced to state 6. During the transition from state 5 to state 6, the start lead 304 from the sequence circuit 300 is energized setting the shift register 203 stages with the Start code illustrated as 1001111. The character latch 227 releases the magnetic tape drive at state 6 to record the Start code on the magnetic tape 275 followed by an index mark. On the closing of contacts Q the sequence circuit is advanced to state 7. At the conclusion of the recording of the Start code when the contacts Q′ again close, the sequence circuit 300 is advanced to state 8. As the sequence circuit 300 is advanced to that state the output leads of the matrix 310 are all grounded thereby introducing seven ones into the shift register. In state 8 relay contacts within the sequence circuit 300 close energizing the block latch 233 over lead 287 initiating the advance of the magnetic tape 275 for a six character increment. When contact Q closes at the beginning of motion the sequence circuit is advanced to state 9. As the magnetic tape 275 moves forward on release of the space latch 233 the seven ones are recorded followed by thirty-five zeros since no further information was introduced into the shift register 203. As the space latch pawl 230 again engages its projection on the cam 220, the contact Q opens and contact Q′ closes. This latter contact advances the sequence circuit 300 to state 10. During this advance, seven additional ones are introduced into the shift register. In state 10 the sequence circuit 300 initiates the release of the character latch 27 allowing the advance of the magnetic tape 275 for one character length, and the seven "1" are recorded on the magnetic tape. The sequence circuit 300 is advanced to condition 11 by contact Q, during motion of the tape 275 while recording the seven ones. As the contact Q′ closes at the end of the tape movement the Stop code is stored in the shift register 203 and the sequence circuit is advanced to state 12 whereupon the character latch 227 is released to record the stop code on the magnetic tape, and sequence circuit 300 is returned to state 1.

Therefore, when the carriage return key on the coding device at the transmitting end is depressed, a code combination totaling seventy bits is recorded on the magnetic tape including the carriage return, start and stop codes, fourteen ones and thirty-five zeros. This code combination allows sufficient time for the reproducing device at the receiving end of the transmission system to duplicate the operation and to be in condition for the reproduction of the next following information.

Figure 5C:
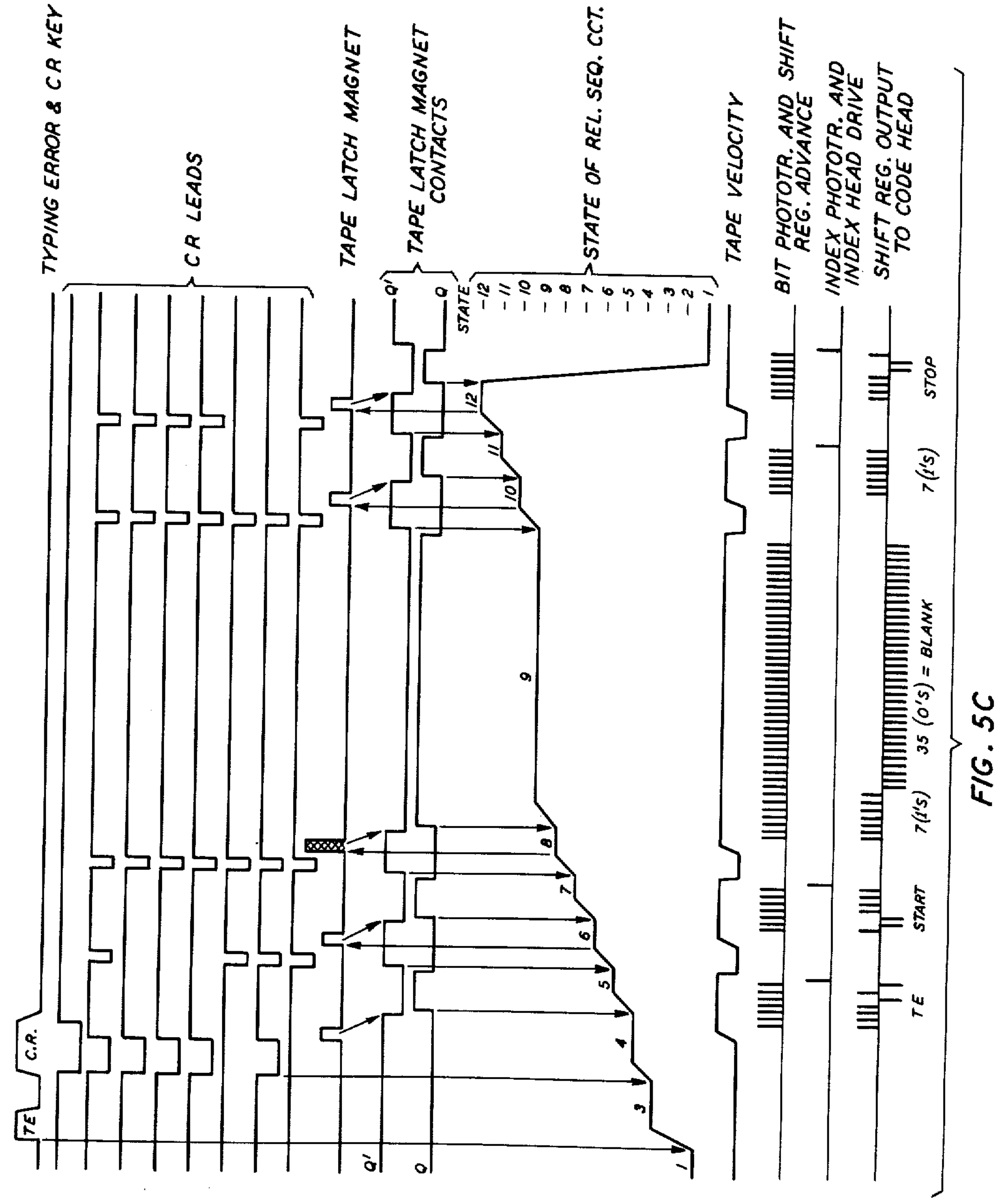

In the normal operation of this apparatus the operator upon typing an incorrect letter or numeral employs a key to indicate that such an error was made followed by the carriage return key and then retypes the entire line. As is explained in the Darwin et al. application identified above, one such transmission system employing the record produced by this apparatus includes means for detecting such an operation and to eliminate the reproduction of the line including the typing error. In order that at the receiving station no evidence of the typing error appears in the reproduced copy it is essential that the carriage return key which follows a typing error key does not produce a carriage return code on the magnetic record. Therefore, the sequence circuit 300 is arranged to detect the order of operation of these controls and to produce on the magnetic tape a code combination indicative of the sequence and permits the transmission system to treat the adjacent lines in the same manner as though no typing error had occurred. This is accomplished as is shown in FIG. 5C. As the typing error key is depressed, the sequence circuit 300 is advanced from state 1 to state 3. Depressing the carriage return key advances the relay sequence circuit to state 4 and the typing error code 1111010 rather than the carriage return code is stored in the shift register 203. The character latch 227 is released via the latch lead 205, followed by opening of contact Q′ and closing of contact Q and the magnetic tape 275 is released to record the typing error code. Closing of contact Q advances the sequence circuit 300 to state 5. As the character latch 227 again engages, the magnetic tape 275 is stopped, contact Q' closes advancing the sequence circuit 300 to state 6 and introducing the Start code into the shift register 203. As the sequence circuit 300 arrives at state 6, an output pulse through the lead 286 releases the character latch 227 allowing the magnetic tape 275 to advance and the Start code is recorded. During this movement again contacts Q' and Q are closed and opened respectively. The closing of contacts Q advances the circuit 300 to state 7 and the closing of contacts Q' at the end of movement of the magnetic tape 275 advances the circuit 300 to state 8 and allows the introduction of seven ones into the shift register 203. On arriving at state 8, the sequence circuit 300 produces a pulse in the output lead 287 to the block latch 233 releasing the magnetic tape 275 for six characters. The seven ones are thereupon recorded on the magnetic tape 275 followed by thirty-five zeros since the shift register 203 has no information stored in it beyond the seven ones. The tape 275 again comes to rest, the closing of contact Q' advances the circuit 300 to state 10 and again produces the introduction of seven ones into the shift register 203. On arriving at state 10, the character latch 227 is again released and the seven ones are recorded. As contacts Q close during the recording of the seven ones, the circuit 300 is advanced to state 11 and upon the closing of contact Q' again it is advanced to state 12 and the Stop code introduced into the shift register 203. At state 12 the character latch 227 is again released and the Stop code recorded. Closure of contacts Q at this time returns the sequence circuit 300 to state 1. The latter operations, including the recording of the start code, seven ones, thirty-five zeros, seven ones and the stop code are similar to that of the normal carriage return operation. This is necessary so that the reproducing device may be able to treat the next following line in the same manner as all other lines. The difference between the information as typed and as reproduced is that the line including the typing error is eliminated and does not appear on the reproduced copy when the transmission system employed herewith is responsive to the typing error code to eliminate the error containing line and prevent its transmission.

Applying the apparatus in the circuitry of this invention, it is possible to make a continuous record of information bits evenly spaced along a magnetic tape which serves as an input to a transmission system. The continuous record of information bits is accomplished despite the fact that there are interruptions in the rate of introduction of information into the apparatus some of predictable length and others unpredictable. The length of time necessary for each of the definite length operations is recognized by a sequence circuit and a code indicative of the type of operation is introduced in bit form on the recording medium followed by code or spacing of sufficient length to allow the duplication of the operation at the receiving end. The sequence circuit similarly is arranged to detect not only the particular operation but the order of operation and to record a code combination indicative of the sequence followed by a space commensurate with the time required by the sequence.

The information bits and the code elements and space elements are all equally spaced on the magnetic tape owing to the fact that the recording of information is in direct relationship to the position of the magnetic tape. This is accomplished since the advance pulses which discharge information from the shift register or storage device in which it is stored are generated responsive to movement of the recording medium. The index marks appear in fixed relationship to the character bits because the recording of both the information bits and the index mark is determined by the light interrupter wheel 250 in which the spacing between slots is uniform and fixed.

The magnetic tape 275 moves an exact distance to record one character and then stops abruptly owing to two features of the magnetic tape drive mechanism. The motor 210 is arranged to operate continuously and to be normally slipping a pair of clutch surfaces in the drive system. The rest of the drive system is held immobile by both the character latch 227 and space latch 233. As the character latch 227 is lifted, the friction of the clutches allows the drive system to lock into sequence with the motor 210 so that the top speed is reached rapidly. The character latch 227 is energized only for a length of time sufficient for the double pawl 225 to be lifted from the notches of the escapement wheel 216. The use of a double pawl insures positive stopping so that the magnetic tape will move no more than a single character. The second or following pawl shown in FIG. 2 prevents bounceback of the escapement wheel as the edge of the notch strikes the leading pawl, therefore the magnetic tape will move without any reversal in direction which would interfere with proper recording of the information on its surface.

In connection with the description of this invention, repeated reference has been made to an electric typewriter which forms a particularly advantageous input device or information bit source. It is recognized, however, that any of several other types of input devices, either operating as conversion units to convert characters to bit form or to handle information previously in bit form may be used. The essential characteristic of such a device is only that it have an information output and any of several control outputs which the relay sequence circuit can operate upon to make the appropriate space and control signals on the magnetic tape.

It is to be understood that the above-described arrangements are merely illustrative of the application of the principles of this invention. Numerous arrangements may be devised by those skilled in the art without departing from the spirit and scope of the invention.

What is claimed is:

1. Information handling apparatus comprising means for converting characters and digits into code combinations of binary coded information bits, an intermediate storage register for temporarily storing the information bits, said converting means connected to introduce the information bits into said storage register, control means for governing the operation of said converting means, means responsive to the operation of said control means for generating code combinations indicative of the controls, said last mentioned means being connected to introduce said code combinations into said storage register, a recording medium, a transducer, means for advancing said recording medium relative to said transducer, means responsive to the introduction of a code combination of bits into said intermediate storage register for enabling said recording medium advancing means, and means responsive to predetermined increments of movement of said recording medium advancing means for discharging the bits in said storage register sequentially to the transducer whereupon the bits are recorded in sequence on the recording medium in fixed spatial relationship to each other.

2. The combination in accordance with claim 1 wherein said means for advancing the recording medium includes a means for restraining the recording medium from motion, said means being responsive to the completion of the introduction of a character into said storage register for releasing said recording medium for movement.

3. Information handling apparatus comprising means for converting characters and digits into code combinations of electrical conditions constituting binary coding information bits, a multistage shift register for temporarily storing the information bits, said converting means connected to introduce an information bit into each of a plurality of stages of said shift register, manual controls for governing the operation of said converting means, means responsive to the operation of said manual controls for generating code combinations indicative of the controls, said last means being connected to introduce code combinations into each of the plurality of stages of said shift register, a single output connection from said shift register from a terminal stage thereof, said output to be connected to a transducer, a recording medium positioned for movement past said transducer, means for advancing said recording medium past said transducer, and means for generating electrical pulses in accordance with predetermined increments of recording medium advance, said pulse generating means connected to the plurality of said stages of shift register for simultaneously advancing the information bits contained therein toward the terminal stage of said shift register and to said transducer with movement of said recording medium.

4. Information handling apparatus comprising means for converting characters and digits into code combinations of electrical conditions constituting binary information bits, a multistage shift register for intermediate storage of information bits, means for generating code combinations of bits indicative of the subsequent control or disposition of the character and digital information, said converting means and said generating means connected to selectively introduce one bit into each of a plurality of stages of said shift register, a magnetic recording medium, a transducer connected to a terminal stage of said shift register, means under the control of said converting means and said code generating means for advancing said magnetic recording medium past said transducer, a plurality of marks disposed on said recording medium advancing means, means for detecting advance of said marks means responsive to increments of advance of said marks for discharging the information serially to said transducer whereby the bits are recorded in sequence on the recording medium.

5. The combination in accordance with claim 4 wherein said generating means includes means for temporarily disabling said converting means during the introduction of information into said shift register and recording of control information.

6. Information handling apparatus comprising a typewriter including a carriage, character and digit keys, a manual control key, and means responsive to the operation of the character and digit keys for establishing electrical conditions constituting corresponding binary codes on a plurality of leads, a multistage shift register having a plurality of stages connected to respective leads of said typewriter whereby binary coded characters are introduced into said shift register upon the operation of the keys of said typewriter, means responsive to the operation of said control key for generating a code combination of electrical conditions, said last means connected to introduce the code combination into said shift register during operation instituted by said control key, a transducer connected to a terminal stage of said shift register, a magnetic recording medium positioned for recording by said transducer, means for intermittently advancing said recording medium past said transducer, first means for restraining said advancing means, said first restraining means being responsive to the introduction of information from said electrical condition establishing means into said shift register, second restraining means for said recording medium advancing means, said second restraining means being responsive to the operation of said manual control key, said second restraining means being operative to disable said first restraining means, and means responsive to incremental movement of said recording medium advancing means for advancing the binary coded information to successive stages of said shift register and to said transducer whereupon the binary code is recorded on said record in uniform spacing.

7. A combination in accordance with claim 6 wherein said apparatus includes means responsive to the operation of manual controls of said typewriter for temporarily disabling said typewriter until the control code combination is recorded on the recording medium.

8. Information handling apparatus comprising a typewriter including a carriage, character and digit keys, manual controls for said typewriter, and means responsive to the operation of the character and digit keys for establishing electrical conditions constituting corresponding binary codes on a plurality of leads, a multistage shift register having a plurality of stages connected to respective leads of said typewriter whereby binary coded characters are introduced into shift register upon the operation of the keys of said typewriter, means responsive to the operation of said manual controls for generating a code combination of electrical conditions, said last means including relay means associated with each manual control, a diode matrix connected to the stages of said shift register, said relay means being operative to introduce code combinations to selected stages of said shift register as determined by said relay means and said diode matrix, a transducer connected to a terminal stage of said shift register, a magnetic recording medium positioned for recording by said transducer, means for advancing said recording medium past said transducer, and means responsive to incremental movement of said recording medium advancing means for advancing the binary coded information to successive stages of said shift register and to said transducer whereupon the binary code is recorded on said record in uniform spacing.

9. A combination in accordance with claim 8 wherein said apparatus includes means for detecting sequences of operation of manual controls of said typewriter and thereupon introducing a code combination into said shift register indicative of the sequence of operations.

10. A combination in accordance with claim 9 wherein said detecting means effects the release of the recording medium for advance in the discharge of the code combination in said shift register to said transducer.

11. Information handling apparatus comprising means for temporarily storing binary coded information, recording means connected to said storage means, a movable recording medium for said recording means, means for moving said recording medium with respect to said recording means, said recording medium moving means being responsive to the completion of introduction of information into said temporary storage means for initiating the advance of said recording medium, and means responsive to incremental movement of said recording medium for discharging binary coded information from said storage means to said recording means whereby the information is recorded on said movable recording medium.

12. Information handling apparatus comprising means for converting characters and digits into code combinations of electrical conditions constituting binary coding information bits, a multistage shift register for temporarily storing the information bits, said converting means connected to introduce an information bit into each of a plurality of stages of said shift register, a single output connection from said shift register from a terminal stage thereof, said output to be connected to a transducer, a recording medium positioned for movement past said transducer, means for advancing said recording medium past said transducer, and means for generating electrical pulses in accordance with predetermined increments of recording medium advance connected to the plurality of said stages of shift register for simultaneously advancing the information bits contained therein toward the terminal stage of said shift register and to said transducer with movement of said recording medium, said pulse generating means comprises a first photoresponsive element, a first light source, light gating means, said light gating means being mechanically coupled to the advancing means of said recording medium to gate the light directed toward said first photoresponsive means at uniform correspondence to incremental advances of the recording medium, a second photoresponsive element, and a second light source positioned on opposite sides of said light gating means, said second photoresponsive element being positioned in inter-incremental spacing relationship with said first photoresponsive element, said light gating means including a plurality of openings adjacent said first photoresponsive element whereby said first photoresponsive element is energized upon each incremental advance from said light gating means, said light gating means including openings adjacent said second photoresponsive element whereby said second photoresponsive element is energized upon the completion of several increments of advance.

References Cited in the file of this patent

UNITED STATES PATENTS

| | | |
|---|---|---|
| 2,702,380 | Brustman et al. | Feb. 15, 1955 |
| 2,814,676 | House | Nov. 26, 1957 |
| 2,818,322 | Blakely | Dec. 31, 1957 |
| 2,858,526 | Deutsch | Oct. 28, 1958 |
| 2,860,325 | Welsh | Nov. 11, 1958 |
| 2,907,002 | Smith | Sept. 29, 1959 |
| 2,907,010 | Spielberg | Sept. 29, 1959 |
| 2,921,293 | Bartelt | Jan. 12, 1960 |
| 2,960,683 | Gregory | Nov. 15, 1960 |